United States Patent [19]

Lombrozo

[11] Patent Number: 5,107,129
[45] Date of Patent: Apr. 21, 1992

[54] FIBER OPTIC SOLID/HYBRID ROCKET MOTOR GRAIN REGRESSION RATE SENSOR

[75] Inventor: Peter C. Lombrozo, San Diego, Calif.

[73] Assignee: General Dynamics Corporation/Space Systems Division, San Diego, Calif.

[21] Appl. No.: 533,230

[22] Filed: Jun. 4, 1990

[51] Int. Cl.$^5$ .............................................. H01J 5/16
[52] U.S. Cl. .............................. 250/554; 250/227.11; 250/227.15; 250/227.28; 340/578
[58] Field of Search ................. 250/227.15, 227.14, 250/227.28, 227.11, 554; 350/96.29; 340/578

[56] References Cited

U.S. PATENT DOCUMENTS

| | | | |
|---|---|---|---|
| 3,201,973 | 8/1965 | Fitzgerald et al. | 250/227.11 |
| 4,420,253 | 12/1983 | Pryor | 250/227.15 |
| 4,843,234 | 6/1989 | Berthold et al. | 250/227.11 |
| 4,865,416 | 9/1989 | Pratt | 350/96.29 |
| 4,884,434 | 12/1989 | Satake et al. | 250/227.14 |

*Primary Examiner*—David C. Nelms
*Assistant Examiner*—John R. Lee
*Attorney, Agent, or Firm*—John R. Duncan; Frank D. Gilliam

[57] ABSTRACT

In one embodiment a bundle of optic fibers of different lengths are inserted through the case wall of a solid fuel or a hybrid rocket motor and extends through the wall of the fuel grain to the edge of the bore in center thereof. As the grain burns in a normal manner, from the center toward the outer periphery of the case, the bright flame of ignition is seen at the end of the fiber optic fiber adjacent to the flame. The length of each fiber in the bundle is used to determine the burn rate and amount of grain left to ignite. In another embodiment different length fibers of a bundle are looped into the grain and back to the exterior of the case and light emitting diodes are positioned at one end of each fiber with a light-detecting means at the other end. The light through the diodes is monitored to detect a no-light condition which exists when a fiber is destroyed by the burn. In yet another embodiment a single optic fiber is used with a light source and a light reception means at one end. As the end of the fiber is destroyed by the ignition of the grain, the time it takes the light from the light source to return to the light sensor is used to establish the burn rate and amount of remaining fuel grain at any given time during the burn.

4 Claims, 2 Drawing Sheets

FIBER OPTIC SOLID/HYBRID ROCKET MOTOR GRAIN REGRESSION RATE SENSOR

BACKGROUND OF THE INVENTION

The invention is directed to measuring the amount of remaining grain (fuel) in a solid state or hybrid rocket motor during burn and more particulary to a means for continually monitoring the amount of remaining grain in solid state rockets and in the case of hybrid motors to control the mixture ratios and propellent utilization by fiber-optic means.

Presently there is no means for monitoring the grain regression rate in solid state or hybrid rocket motors due to the high temperature of the grain burn and the harsh environment. Any useful sensor must be either extremely durable, non-intrusive, or sacrificial; and not hamper the reliability or safety of the motor itself.

There has not been a suitable means for monitoring or controlling the burn of either solid state or hybrid rocket motors until the emergence of the present invention. The present invention will fill a long felt need for monitoring the burn rate and the amount of remaining grain in solid state and hybrid rocket motors and will find wide acceptance in the industry.

SUMMARY OF THE INVENTION

The invention is directed to the use of optic fibers either in bundles of different lengths or a single or equal length bundle of fibers for the monitoring of burn of fuel in solid fuel and hybrid rocket engines.

In one embodiment, a bundle of different length fiber optic fibers are inserted through the outer fuel shell or casing containing the solid state rocket fuel. The longest fiber extends radially toward the center of the rocket fuel, i.e. is the same length as the fuel wall thickness and the remaining fibers are of different lengths representative of different grain depths as measured from the outer wall of the casing. When the grain is ignited, the inner end of the optic fiber adjacent to the flame transmits light from this flame to the outer tip of that fiber where it is monitored. Knowing the distance from the outer wall of the casing of each fiber and knowing which fiber or fibers are transmitting light determines the distance from the outer wall of the casing to the flame.

In a second embodiment, different length fibers are looped from the outer surface of the wall of the casing into the grain and looped back to the outer wall of the casing. Each loop is shorter than the previous loop thereby the loop end of each fiber extends a different distance into the grain. A light emitting diode is positioned at one end of each looped fiber and a detector is positioned at the opposite end of each looped fiber. Normally, each loop will transmit light from the diode end to the detector end. When the grain is ignited, successive loops will be burnt through at their inner grain end causing the detection of light from its diode to be terminated at its receptor end. Knowing the distance from the wall of the casing to each looped end, it is possible to determine the location and rate of the burn by the sequential light termination at the fiber detection ends.

In a third embodiment, a single optic fiber extends from the outer wall of the casing through the wall of the grain, i.e. toward the center of the casing. A light source at the outer casing end is transmitted toward the grain end of the fiber and the time it takes for the light to return to the source is measured and converted to distance to determine the rate of burn and the remaining grain. An interferometric measurement of light path length is also possible. As the grain burns, the end of the optic fiber also burns thereby always positioning the grain end of the fiber at the flame area of the grain.

An object of this invention is to provide a means of continuous monitoring of the burn rate and the amount of remaining grain in a solid state or hybrid rocket motor.

Another object of this invention is to provide a fiber optic means for monitoring the remaining grain in a solid state or hybrid rocket motor.

Another object of this invention is to provide a bundle of different and known lengths of optic fibers to monitor the burn rate and amount of grain left in a solid state or hybrid rocket motor.

Yet another object of this invention is to provide a bundle of optic fiber loops that extent different distances from the outer wall of the grain casing into the grain and back through the outer wall of the casing and include a light source at one end and a light detection means at the other end to monitor the burn rate of the grain.

Still another object of this invention is to provide a single optic fiber extending from the outer wall of the casing into the grain such that the inner end of the outer fiber burns at the same rate as the grain. A light of a frequency different from the flame is transmitted from the outer end of the fiber and the time it takes the light to return to the source of the light and/or the wave phase which with it returns determines the distances to the flame.

These and other objects and advantages of the present invention will become apparent to those skilled in the art after considering the following detailed specification in which the preferred embodiment are described in conjunction with the accompanying drawing Figures.

BRIEF DESCRIPTION OF THE DRAWING FIGURES

DETAILED DESCRIPTION OF THE EMBODIMENTS OF THE INVENTION

Figure 1:
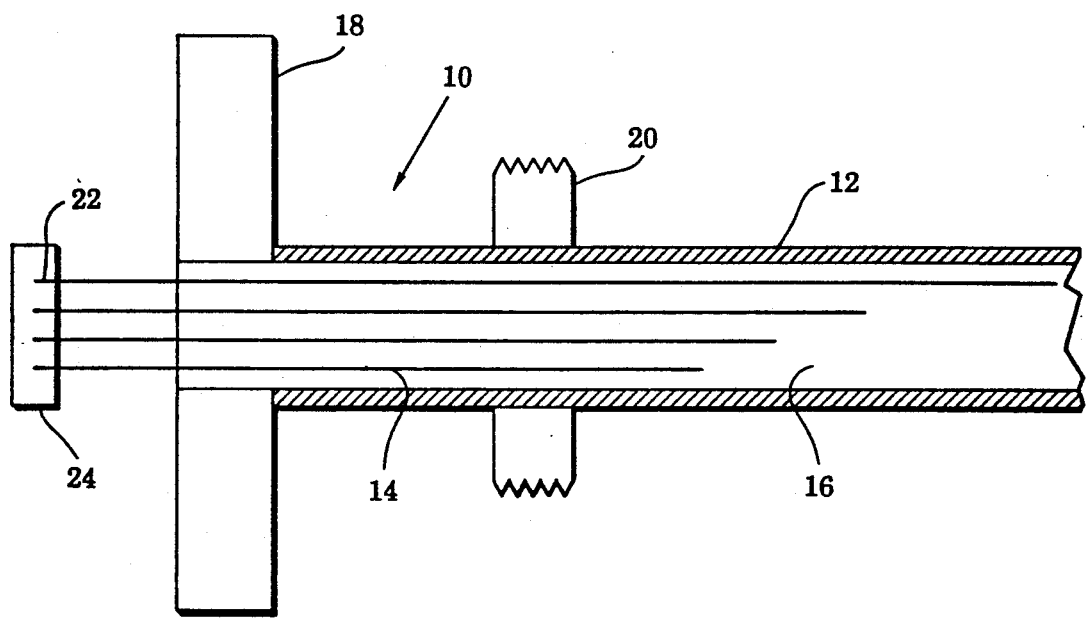
FIG. 1 depicts a cross-sectional cutaway showing of the fiber optic bundle probe used in a first embodiment of the invention.

Referring now to the various drawing Figures, FIG. 1 depicts the first embodiment of the present invention. The first embodiment comprises a probe 10 having an outer housing 12 for encasing a bundle of a plurality of different length optic fibers 14. The housing can be constructed of any convenient ablative material. An ablative packing material 16 is also contained within the housing to separate the fibers 14 of the fiber optic bundle. The outer end of the probe housing, shown at the left side of drawing FIG. 1, has a retainer plate 18 formed thereon and a threaded retaining nut/plate 20 intermediate its ends for threading or securing into the fuel grain. The outer end 22 of each fiber of the bundle are terminated at a light detector or all of the fibers are terminated into a detector array 24 which independently detects the light from each fiber 14. Detectors and detector arrays that perform this and similar functions are well known in the art.

Figure 4:
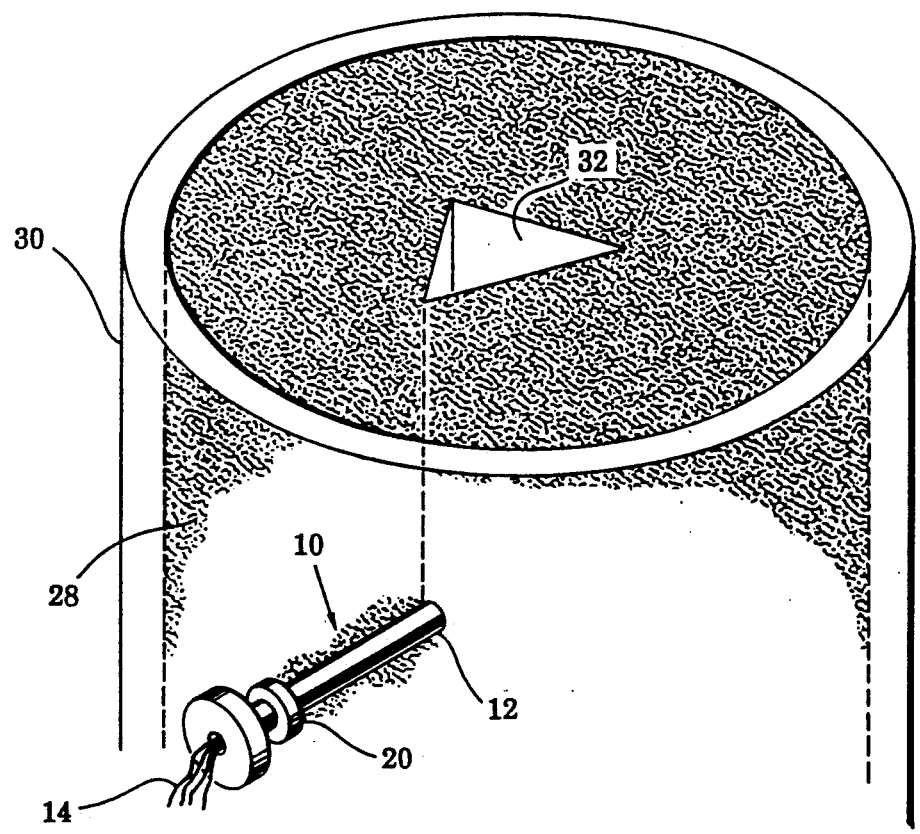
FIG. 4 is a partial cross-sectional showing of the probe of FIG. 1 inserted through the wall of a solid fuel casing and extends to the center thereof through the fuel.

In operation as the fuel burns from the center toward the outer wall of the fuel housing, see FIG. 4, the light of the fire can be detected from the fiber or fibers inner tip and registered by the detector. The shortest fiber detecting light is a positive indication of the position of the flame and an indication of the amount of fuel left to burn, The changing of light reception from one fiber to the next shorter one will be an indication of the burn rate of the fuel.

Figure 2:
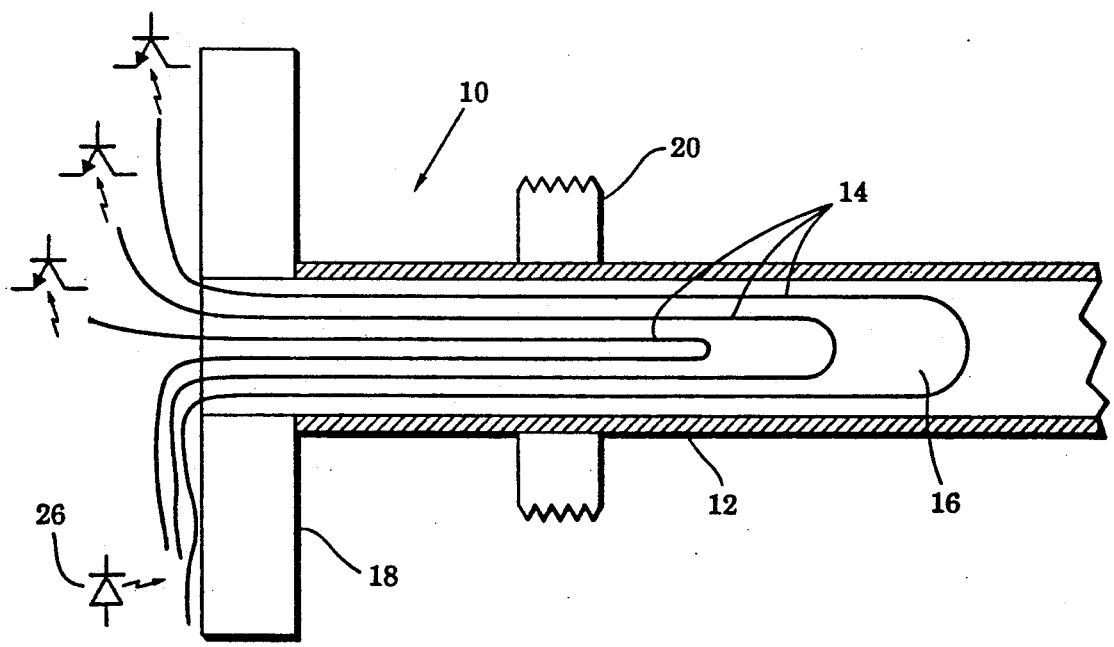
FIG. 2 is a second embodiment of the probe of the invention.

Referring now specifically to drawing FIG. 2, a second embodiment of a fiber optic sold fuel burn monitoring probe 10 is depicted. In this embodiment, a bundle of optic fibers 14 are employed in the configuration shown, namely, each fiber of the bundle is a continuous loop and extends from the outer end surface of the probe into the fuel and back out of the outer end surface. The probe 10 and the filler material 16 are the same as previously described under the description of the first embodiment. The probe can be inserted into the fuel and be either adhered thereto or threaded into the fuel by use of a threaded nut/plate 20 as aforementioned. At least one light emitting diode 26 or other convenient source of light is positioned to direct light into one end all of the fibers of the bundle for transmitting a light of a specific frequency. At the other end of each fiber, a detector or a common detector array 24 is positioned to receive the transmitted light from the source through each fiber. As the flame of the engine reaches each loop end and the loop is burnt through, the termination of the transmitted light is detected indicating the presence of the flame at the shortest open loop.

Figure 3:
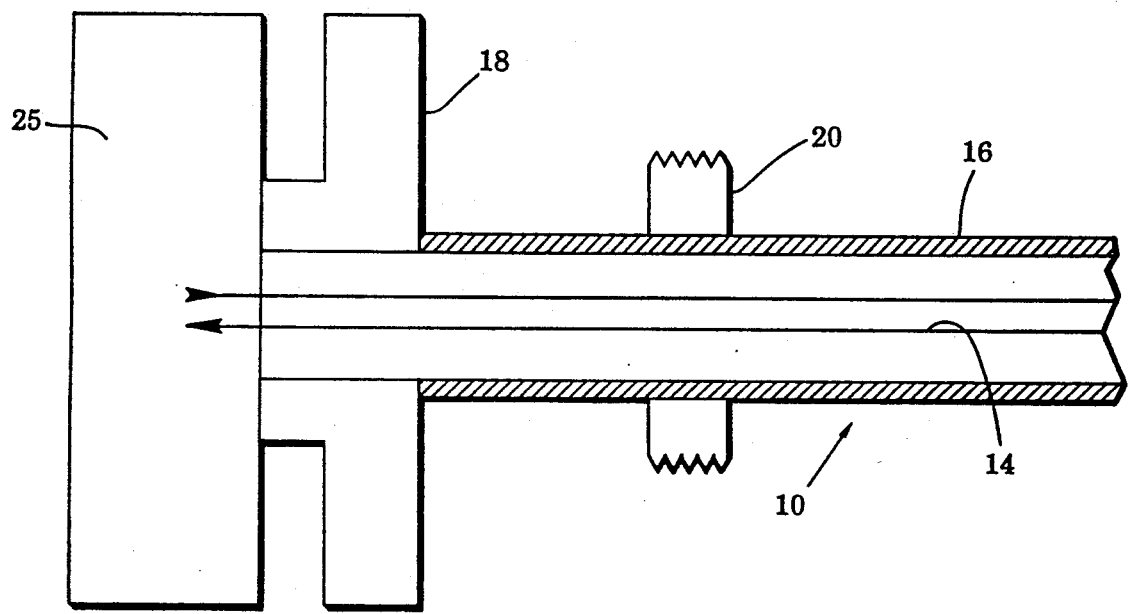
FIG. 3 is a third embodiment of the probe of the invention.

In a third embodiment as seen in drawing FIG. 3, a similarly constructed probe housing and filler is used with a single optic fiber 14. The single fiber extends the entire length of the probe. A combination light transmitting source for transmitting light at a specific frequency different from the light frequency of the fuel produced flame and a detector 27 tuned to receive only that specific frequency from the light source is positioned at the outer probe end of the fiber. A timing means within the light transmitting source and detector transmits light and then terminates the transmission and receives reflections of the transmitted light back to the detector portion. The travel time of the light through the fiber and its return is converted to fiber length which is a measurement of the remaining fuel grain. Obviously, as the flame destroys the fiber at the flame end, the length of the fiber is reduced and hence, the travel time of the light through the fiber and the return reflection time is reduced. The rate of reduction of the fiber establishes the burn rate of the fuel.

The light phase conditions can also be used in this device to detect fiber length via interferometry.

Referring now specifically to drawing FIG. 4, this Figure depicts a cutaway showing of a portion of the solid or hybrid fuel rocket casing 28 with a cross-sectional showing of a probe 10 positioned in place for use in measuring the burn rate and remaining fuel in the casing 28. The probe 10 is inserted through the fuel casing wall 30 to a depth substantially equal to the radius of the casing 28 and into a vertical port 32. The space between the casing wall 30 and the port 32 contains the grain or rocket fuel. As the rocket fuel burns, the optics fiber or fibers are reduced in length by the flame of the burning rocket fuel and measurements are made in a manner consistent with the probe embodiment last explained.

While described above are the principles of the various embodiments of the solid or hybrid rocket motor grain regression rate sensor of the invention in connection with specific apparatus it is to be clearly understood that this description is made only by way of example and not as a limitation to the scope of the invention as set forth in the summary thereof and in the accompanying claims.

What is claimed is:

1. Sensor for determining the location of the flame in burning fuel in a solid or hybrid rocket fuel motor and the rate of burn of that fuel comprising:

an elongated housing having a longitudinal center therethrough containing rocket motor fuel;

a probe positioned substantially normal to said longitudinal center, having a first end extending outside of said housing and a second end extending through said fuel to the longitudinal center of said housing;

said probe comprising an outer ablative housing for encasing at least one optic fiber, one end being positioned adjacent to said second end of said probe and the other end extending from said first end of said probe whereby light is transmitted to said other end of said at least one optic fiber; and a source of light positioned at said other end of said at least one optic fiber having a light frequency different from the frequency of said flame and a detector means for detecting the light from said source of light reflected back through said at least one optic fiber whereby the time the light takes to travel from said source of light back to said detector through said at least one optic fiber and/or its phase and/or interference properties determines the length of said at least one optic fiber and amount of remaining rocket fuel.

2. The invention as defined in claim 1 wherein said at least one optic fiber comprises a plurality of different length optic fibers.

3. The invention as defined in claim 2 wherein said plurality of different length optic fibers have an opaque ablative packing material separating each different length fiber.

4. Sensor for determining the location of a flame burning in a solid or hybrid rocket fuel motor and the rate of burn of that fuel comprising:

an elongated housing with a longitudinal center containing rocket motor fuel;

a probe positioned normal to said longitudinal center having an outer ablative housing with, a first end extending outside of said housing and a second end extending through said fuel to the center of said housing;

said probe comprising a plurality of different length loops of optic fibers having an ablative packing material separating each different length loop which extend from said first end of said probe into said rocket fuel through the wall of said elongated housing and looped back to said first end of said probe in a continuous length;

a source of light of a frequency different from the frequency of said flame at one end of each of said plurality of optic fiber loops for transmitting light through each of the loops; and a detector at the opposite end of each of said plurality of loops for detecting the light from said source through said plurality of loops whereby the absence of said source of light from the detector end of any of said loops is an indication of the loop being opened by said flame being adjacent thereto.

* * * * *